United States Patent
Tanahashi et al.

(10) Patent No.: US 9,903,261 B2
(45) Date of Patent: Feb. 27, 2018

(54) VEHICLE COOLING DEVICE

(71) Applicant: TOYOTA JIDOSHA KABUSHIKI KAISHA, Toyota-shi, Aichi-ken (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 26 days.

(21) Appl. No.: 14/972,184

(22) Filed: Dec. 17, 2015

(65) Prior Publication Data

US 2016/0177811 A1    Jun. 23, 2016

(30) Foreign Application Priority Data

Dec. 19, 2014  (JP) .................................. 2014-257972

(51) Int. Cl.
 F01P 11/02  (2006.01)
 F01P 11/14  (2006.01)
 (Continued)

(52) U.S. Cl.
 CPC ............... F01P 11/14 (2013.01); B60K 11/04 (2013.01); F01P 9/00 (2013.01); F01P 3/20 (2013.01);
 (Continued)

(58) Field of Classification Search
 CPC .... F01P 3/20; F01P 11/02; F01P 11/04; F01P 5/06; F02B 63/04
 (Continued)

(56) References Cited

U.S. PATENT DOCUMENTS 3,597,668 A    8/1971   Yoshimine
3,922,214 A    11/1975  Van Cakenberghe
(Continued)

FOREIGN PATENT DOCUMENTS

JP    S50-026778         3/1975
JP    S5546053 A   *    3/1980
(Continued)

OTHER PUBLICATIONS

Specification of U.S. Appl. No. 15/032,793, filed Apr. 28, 2016 (later published as US 2016-0280162 on Sep. 29, 2016).
(Continued)

*Primary Examiner* — Jacob Amick
*Assistant Examiner* — Charles Brauch
(74) *Attorney, Agent, or Firm* — Andrews Kurth Kenyon LLP (57) ABSTRACT

A vehicle cooling device includes: at least one of a radiator and a condenser; a fan cover including a fan configured to cool the at least one of the radiator and the condenser, the radiator, the condenser and the fan cover being positively charged; a connecting part that connects the at least one of the radiator and the condenser and the fan cover with each other; and a self-discharge static eliminator that is installed on a non-conductive wall surface of the connecting part, and is configured to decrease an electric charge amount of a part of the non-conductive wall surface within a limited range, centered on a location where the self-discharge static eliminator is installed, static elimination of the at least one of the radiator and the condenser being performed by the self-discharge static eliminator.

9 Claims, 8 Drawing Sheets

(51) Int. Cl.
*B60K 11/04* (2006.01)
*F01P 9/00* (2006.01)
*F01P 5/06* (2006.01)
*F01P 11/04* (2006.01)
*F01P 3/20* (2006.01)
*F02B 63/04* (2006.01)

(52) U.S. Cl.
CPC ................ *F01P 5/06* (2013.01); *F01P 11/02* (2013.01); *F01P 11/04* (2013.01); *F02B 63/04* (2013.01)

(58) Field of Classification Search
USPC ...................................................... 123/41.55
See application file for complete search history.

(56) References Cited

U.S. PATENT DOCUMENTS

| | | | |
|---|---|---|---|
| 4,795,935 A | 1/1989 | Fujii et al. | |
| 5,095,400 A | 3/1992 | Saito | |
| 5,212,451 A | 5/1993 | Werner, Jr. | |
| 5,271,473 A * | 12/1993 | Ikeda | B60K 11/04 180/68.4 |
| 5,382,359 A | 1/1995 | Brandt | |
| 5,996,684 A * | 12/1999 | Clifton | B60H 1/3229 165/121 |
| 6,235,385 B1 | 5/2001 | Lee | |
| 7,248,454 B2 | 7/2007 | Takayanagi | |
| 7,684,169 B1 | 3/2010 | Larkin | |
| 7,832,528 B1 | 11/2010 | Liang | |
| 7,971,689 B2 | 7/2011 | Moore | |
| 8,503,154 B2 | 8/2013 | Nakai | |
| 9,044,916 B2 | 6/2015 | Koike et al. | |
| 2002/0000289 A1* | 1/2002 | Nickell | A43B 1/0045 156/244.13 |
| 2002/0179311 A1 | 12/2002 | Alper | |
| 2003/0183465 A1 | 10/2003 | Ikeda | |
| 2003/0202830 A1* | 10/2003 | Oh | B65H 37/00 399/390 |
| 2007/0144462 A1* | 6/2007 | Green | F01P 11/14 123/41.15 |
| 2008/0036241 A1 | 2/2008 | Aisenbrey | |
| 2011/0139121 A1* | 6/2011 | Hackenberg | F02M 61/1806 123/445 |
| 2012/0039012 A1 | 2/2012 | Nakai | |
| 2013/0183859 A1* | 7/2013 | Chang | H01R 13/658 439/607.01 |
| 2016/0059838 A1 | 3/2016 | Yamada et al. | |
| 2016/0108868 A1 | 4/2016 | Tanahashi et al. | |
| 2016/0186639 A1 | 6/2016 | Tanahashi et al. | |
| 2016/0186703 A1 | 6/2016 | Tanahashi et al. | |
| 2016/0200270 A1 | 7/2016 | Tanahashi et al. | |
| 2016/0208748 A1 | 7/2016 | Tanahashi et al. | |
| 2016/0214453 A1 | 7/2016 | Tanahashi et al. | |
| 2016/0223024 A1 | 8/2016 | Tanahashi et al. | |
| 2016/0230824 A1 | 8/2016 | Tanahashi et al. | |

FOREIGN PATENT DOCUMENTS

| | | |
|---|---|---|
| JP | S61-194999 | 8/1986 |
| JP | H063396 A | 1/1994 |
| JP | 2001-355524 A | 12/2001 |
| JP | 2002-104106 A | 4/2002 |
| JP | 2003-226134 A | 8/2003 |
| JP | 2006-088880 A | 4/2006 |
| JP | 2006234093 A | 9/2006 |
| JP | 2008-143476 A | 6/2008 |
| JP | 2008181694 A | 8/2008 |
| JP | 2010-192177 A | 9/2010 |
| JP | H05-238438 A | 9/2013 |
| WO | 2015/064195 A1 | 5/2015 |

OTHER PUBLICATIONS

Office Action issued in U.S. Appl. No. 15/018,085 dated Dec. 14, 2016.
U.S. Appl. No. 14/882,978, filed Oct. 14, 2015.
U.S. Appl. No. 14/979,664, filed Dec. 28, 2015.
US Patent and Trademark Office, Final Office Action issued in U.S. Appl. No. 15/018,085, dated Jun. 7, 2017, 27 pages.
U.S. Patent and Trademark Office, Notice of Allowance issued in U.S. Appl. No. 15/018,085, dated Oct. 20, 2017, 17 pages.

* cited by examiner

VEHICLE COOLING DEVICE

INCORPORATION BY REFERENCE

The disclosure of Japanese Patent Application No. 2014-257972 filed on Dec. 19, 2014 including the specification, drawings and abstract is incorporated herein by reference in its entirety.

BACKGROUND OF THE INVENTION

1. Field of the Invention

Embodiments of the present invention relate to a vehicle cooling device.

2. Description of Related Art

A vehicle is publicly known, in which a discharge device such as a discharge antenna is mounted on an engine or an engine-related member of the vehicle, and high-voltage electricity, static electricity and so on generated and charged in the engine area is discharged and emitted outside, thereby improving fuel economy (for example, see Japanese Patent Application Publication No. 5-238438 (JP 5-238438 A)).

As described in JP 5-238438 A, it is known that static electricity is charged to a vehicle, and that static electricity charged to a vehicle has some kind of influence on driving of the vehicle. However, it is not clearly known why and how the static electricity charged to a vehicle affects driving of the vehicle. However, without knowing why and how static electricity charged to a vehicle affects driving of the vehicle, it is not possible to appropriately deal with static electricity charged to a vehicle.

SUMMARY

The inventors paid attention especially to a radiator, a condenser, and a fan cover including a fan for cooling the radiator and the condenser, and studied an influence of static electricity charged to the radiator or the condenser on driving of a vehicle. As a result of the study, the inventors found that static electricity charged to the radiator or the condenser greatly affects cooling efficiency. Then, based on this discovery, the inventors found an adequate static elimination method required for improving cooling efficiency.

Embodiments of the present invention relate to a vehicle cooling device.

A vehicle cooling device according to an aspect of the invention includes: at least one of a radiator and a condenser; a fan cover including a fan configured to cool the at least one of the radiator and the condenser; the radiator, the condenser and the fan cover being positively charged; a connecting part that connects the fan cover and the at least one of the radiator and the condenser with each other; and a self-discharge static eliminator. The self-discharge static eliminator is installed on a non-conductive wall surface of the connecting part, and is configured to decrease an electric charge amount of a part of the non-conductive wall surface within a limited range, centered on a location where the self-discharge static eliminator is installed, static elimination of the at least one of the radiator and the condenser being performed by the self-discharge static eliminator.

According to this aspect of the invention, by installing the self-discharge static eliminator on the non-conductive wall surface of the connecting part that connects the radiator or the condenser with the fan cover, static elimination of the radiator or the condenser is performed, thereby improving cooling efficiency.

In this aspect of the invention, the fan cover may be made of a non-conductive synthetic resin material.

In the above configuration, the self-discharge static eliminator may be installed on a wall surface of the fan cover near the connecting part.

In this aspect of the invention, the at least one of the radiator and the condenser and the fan cover may be connected with each other through a detachable connector. The self-discharge static eliminator may be installed on the connector.

In this aspect of the invention, the at least one of the radiator and the condenser may be the radiator. A tank of the radiator may be made of a non-conductive synthetic resin material. The tank may be connected with the fan cover. The self-discharge static eliminator may be installed on a wall surface of the tank near the connecting part.

In this aspect of the invention, the self-discharge static eliminator may be formed of metallic foil adhered to the non-conductive wall surface by a conductive adhesive.

In the above configuration, the self-discharge static eliminator may have a corner part configured to cause self-discharge.

In the above configuration, the self-discharge static eliminator may have a rectangular flat shape.

In this aspect of the invention, the self-discharge static eliminator may be formed of a conductive thin film that is formed integrally on the non-conductive wall surface.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
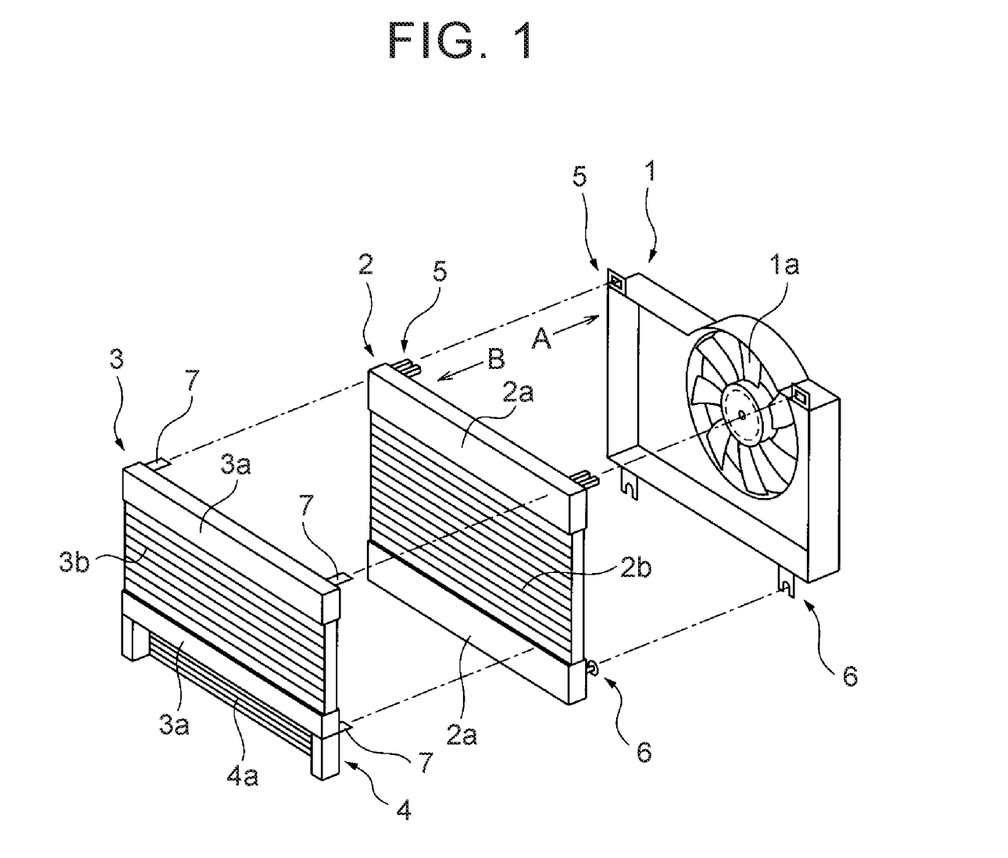
FIG. 1 is an exploded perspective view showing an illustration of a fan cover, a radiator, and a condenser according to an embodiment of the invention.

Herein below, an embodiment of the invention is explained with reference to FIG. 1 to FIG. 9B. FIG. 1 shows an exploded perspective view showing an illustration of a vehicle cooling device including a fan cover 1, a radiator 2, and a condenser 3. With reference to FIG. 1, a fan 1a and an electric motor 1b (FIG. 2A) for driving the fan 1a are mounted on the fan cover 1. Although an actual structure of the fan cover 1 is complex, the fan cover 1 shown in FIG. 1 is extremely simplified. In the embodiment shown in FIG. 1, the fan cover 1 is made of a non-conductive synthetic resin material.

Meanwhile, the radiator 2 shown in FIG. 1 is a radiator including cooling water for an engine. In the embodiment shown in FIG. 1, the radiator 2 includes upper and lower tanks 2a, and a core 2b arranged between the upper and lower tanks 2a. In the embodiment shown in FIG. 1, the upper and lower tanks 2a are made of a non-conductive synthetic resin material, and the core 2b is made of a metallic material. In the embodiment shown in FIG. 1, the condenser 3 is a condenser for an air conditioner. The condenser 3 includes upper and lower tanks 3a, and a core 3b. The core 3b is arranged between the upper and lower tanks 3a. The entire condenser 3 is made of a metallic material. Further, in the embodiment shown in FIG. 1, an inverter converter radiator 4 is arranged below the condenser 3. The inverter converter radiator 4 is used for a hybrid engine including an electric motor. Reference numeral 4a indicates a core of the inverter converter radiator 4.

The radiator 2 is supported by a vehicle body or a chassis through a support member made of, for example, a rubber material. The fan cover 1 is coupled with one side of the radiator 2 by connectors 5 and connectors 6. The connectors 5 are arranged on both sides of each of an upper end part of the fan cover 1 and an upper end part of the radiator 2. The connectors 6 are arranged on both sides of each of a lower end part of the fan cover 1 and a lower end part of the radiator 2. The condenser 3 is coupled with the other side of the radiator 2, together with the inverter converter radiator 4, by connectors 7. The connectors 7 are arranged on both sides of each of an upper end part and a lower end part of the condenser 3. When the fan 1a is driven by the electric motor 1b, suction force of the fan 1a first circulates outside air inside the condenser 3 and the inverter converter radiator 4. At this time, refrigerant flowing inside the condenser 3 and the inverter converter radiator 4 is cooled, respectively. Then, outside air is circulated inside the radiator 2, and, at that time, cooling water inside the radiator 2 is cooled.

Figure 2A:
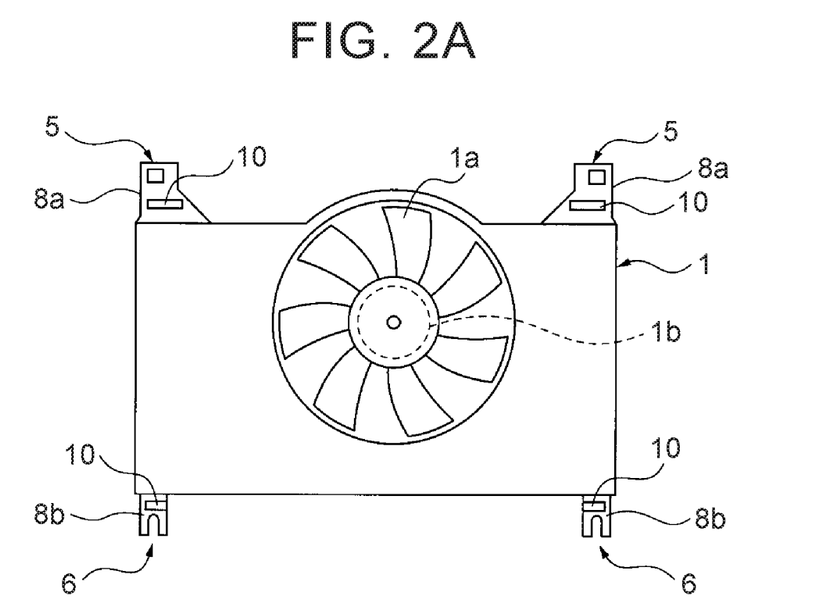
FIG. 2A and FIG. 2B are front views of the fan cover and the radiator, respectively, according to the embodiment of the invention.
Figure 2B:
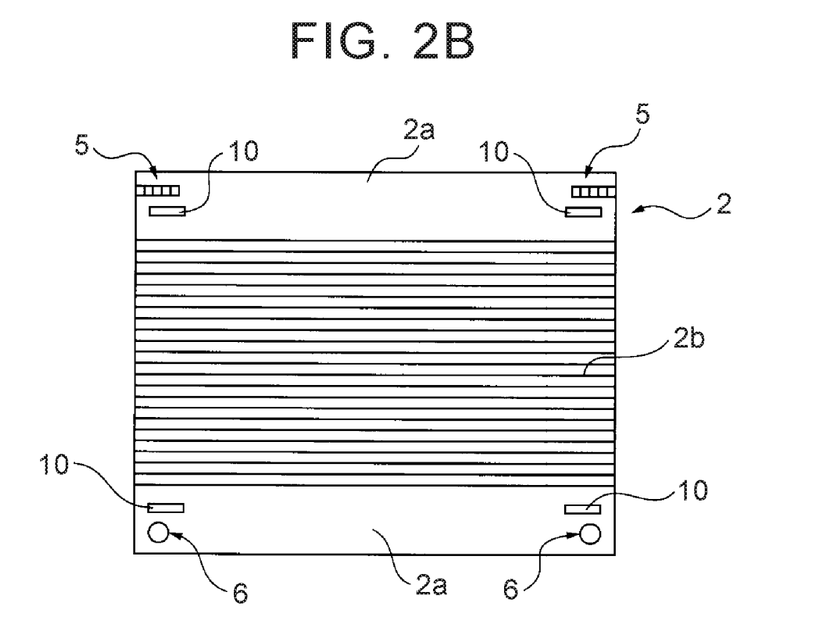
Figure 3:
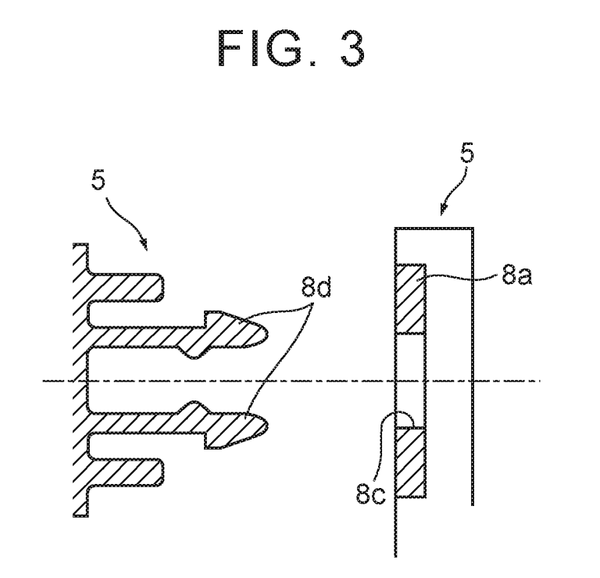
FIG. 3 is a side sectional view of the fan cover and the radiator shown in FIG. 1, FIG. 2A and FIG. 2B.

FIG. 2A shows a front view of the fan cover 1 seen along arrow A in FIG. 1, and FIG. 2B is a front view of the radiator 2 seen along arrow B in FIG. 1. As shown in FIG. 2A, flat-shaped flanges 8a extend upwardly from both sides of an upper end part of the fan cover 1, and the connectors 5 on one side are formed on the flanges 8a. Meanwhile, as shown in FIG. 2A, flat-shaped flanges 8b extend downwardly from both sides of a lower end part of the fan cover 1, and the connectors 6 on one side are formed on the flange 8b. FIG. 3 shows a plane sectional view of the connector 5. As shown in FIG. 3, the connector 5 has an opening 8c formed in the flange 8a, and a pair of elastic hook members 8d. The elastic hook members 8d can be snap-fitted into the opening 8c. The pair of elastic hook members 8d is made of a non-conductive synthetic resin material, and formed integrally with the upper tank 2a of the radiator 2.

Figure 4A:
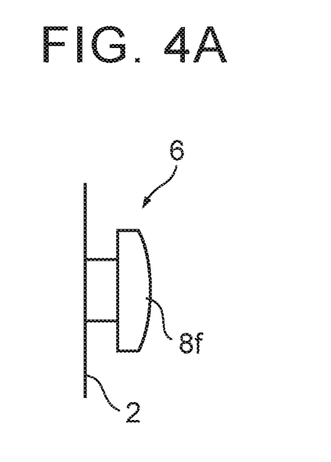
FIG. 4A and FIG. 4B are views showing connectors of the fan cover and the radiator shown in FIG. 1, FIG. 2A and FIG. 2B.
Figure 4B:
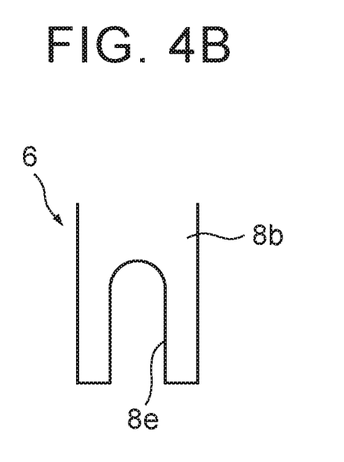

FIG. 4A and FIG. 4B show the connector 6. The connector 6 has a latching part 8f and a U-shaped groove part 8e. The latching part 8f is formed in the lower tank 2a of the radiator 2 and has an enlarged head and a small-diameter shaft part as shown in FIG. 4A. The U-shaped groove part 8e is formed in the lower end part of the flange 8b of the fan cover 1 and is fitted to the small-diameter shaft part. The latching part 8f is made of a non-conductive synthetic resin material, and is formed integrally with the lower tank 2a of the radiator 2. When fixing the fan cover 1 to the radiator 2, the U-shaped groove parts 8e formed in the lower end parts of the flanges 8b of the fan cover 1 are first fitted to the small-diameter shaft parts of the latching parts 8f formed in the lower tank 2a of the radiator 2. Thereafter, the openings 8c formed in the flanges 8a of the fan cover 1 are fitted into the elastic hook members 8d that are formed integrally with the upper tank 2a of the radiator 2. Thus, the fan cover 1 is coupled with the radiator 2.

Once a vehicle is run, each part of tires comes into contact with and is separated from a road surface repeatedly, and static electricity is thus generated. Static electricity is also generated as components of an engine, and components of a braking device move relative to each other. Further, static electricity is generated due to air that flows on and is in frictional contact with an outer peripheral surface of the vehicle when the vehicle is running. The static electricity generated as above charges the body, engine, and so on of the vehicle, and the fan cover 1, the radiator 2, the condenser 3, and the inverter converter radiator 4 are also charged. Further, rotation of the electric motor 1b for the fan 1a, which is supported by the fan cover 1, generates static electricity. As a result, a large amount of charge is present on the surface of the fan cover 1 made of a non-conductive synthetic resin material.

When a large amount of charge is present on the fan cover 1, a voltage value of the surface of the fan cover 1 becomes high. When the voltage value of the surface of the fan cover 1 becomes high, a voltage value of the surface of the radiator 2, which is coupled with the fan cover 1 through the connectors 5, 6, becomes high. When the voltage value of the surface of the radiator 2 becomes high, voltage values of surfaces of the condenser 3 and the inverter converter radiator 4, which are coupled with the radiator 2 through the connectors 7, become high. In fact, it has been confirmed that the surface of the fan cover 1, the surface of the radiator 2, the surface of the condenser 3, and the surface of the inverter converter radiator 4 are positively charged. Moreover, it has been confirmed that there are instances where the voltage values of the surfaces of the fan cover 1, the radiator 2, the condenser 3, and the inverter converter radiator 4 become as high as 1000 (v) or higher.

It has been confirmed that, when a voltage value becomes high on a surface of a thin wall made of a non-conductive synthetic resin material, a flow of air along the surface of the thin wall changes. Thus, the inventors conducted an experiment to confirm how an air flow along the surface of the thin wall changes in accordance with a voltage value on the surface of the thin wall, and confirmed the following phenomena.

Figure 6A:
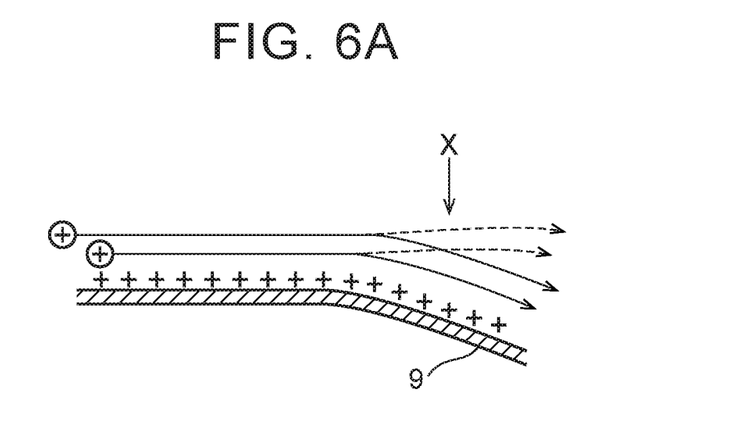
FIG. 6A and FIG. 6B are views for explaining a change of an air flow according to the embodiment of the invention.

FIG. 6A shows air flows along a surface of a thin wall 9 that is positively charged. Since air tends to be positively charged, FIG. 6A shows a case where positively-charged air flows along the surface of the thin wall 9 that is positively charged. In FIG. 6A, solid-line arrows show air flows when a voltage value on the surface of the thin wall 9 is low. In this case, air flows along the surface of the thin wall 9. On the contrary, broken-line arrows show air flows when voltage value on the surface of the thin wall 9 is high. In this case, air flows so as to be separated from the surface of the thin wall 9 at a point where the surface of the thin wall 9 curves downwardly, or a point where the air flow is easily separated from the surface of the thin wall 9.

Figure 6B:
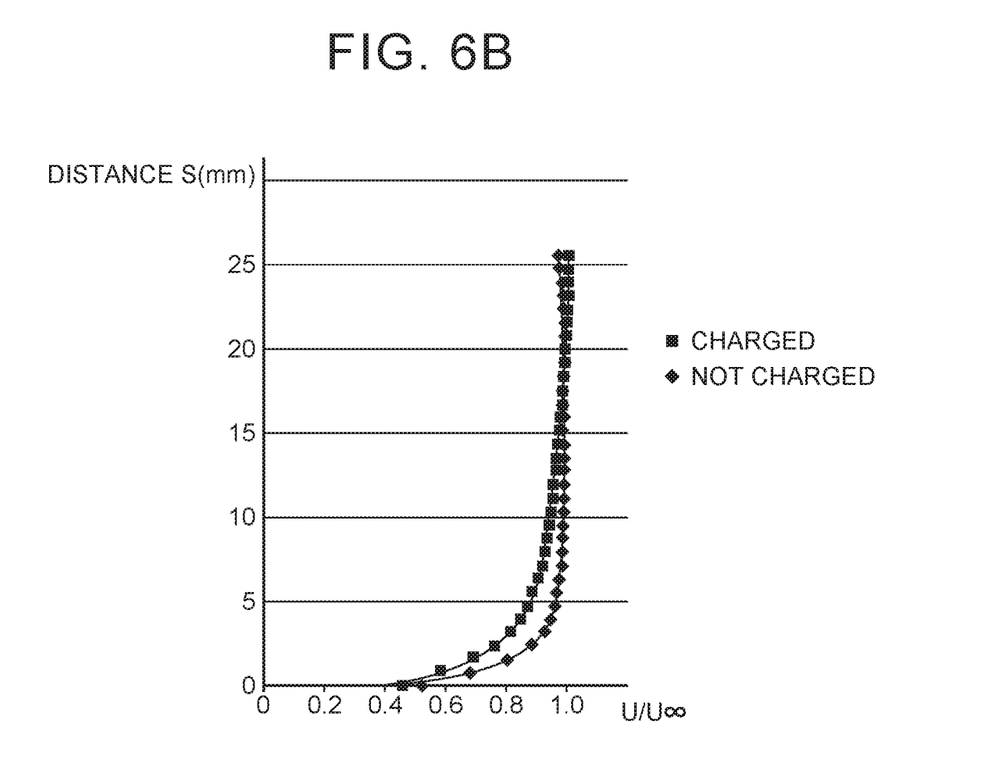

FIG. 6B shows measured values of a velocity ratio $U/U_\infty$, at point X (FIG. 6A). The "$U_\infty$" is a flow velocity of a main flow of air that flows along the surface of the thin wall 9 in FIG. 6A. The "U" is a flow velocity at a point separated from the surface of the thin wall 9 by a distance S in FIG. 6A. Each point shown as a black rhombus in FIG. 6B shows a case where the surface of the thin wall 9 is not positively charged, and each point shown as a black quadrangle in FIG. 6B shows a case where the surface of the thin wall 9 is positively charged. It is understood from FIG. 6B that, in the case where the surface of the thin wall 9 is positively charged, a velocity boundary layer is separated more from the surface of the thin wall 9 compared to the case where the surface of the thin wall 9 is not positively charged. Therefore, in the case where the surface of the thin wall 9 is positively charged, air flows so as to be separated from the surface of the thin wall 9 as shown as the broken-line arrows in FIG. 6A.

As stated above, air tends to be positively charged. Therefore, positive air ions (expressed as + in a circle) are present in a part of air. Accordingly, when the surface of the thin wall 9 is positively charged, repulsive force acts between the positive air ions and the surface of the thin wall 9. Thus, as shown as the broken-line arrows in FIG. 6A, air flows so as to be separated from the surface of the thin wall 9 at the point where the surface of the thin wall 9 is curved downwardly, or the point where the air flow is easily separated from the surface of the thin wall 9. It is thus confirmed from experimentation that an air flow along the surface of the thin wall 9 is separated from the surface of the thin wall 9 because of positive charge on the surface of the thin wall 9. In this case, it is known that the higher the voltage value becomes on the surface of the thin wall 9, the more the air flow along the surface of the thin wall 9 is separated from the surface of the thin wall 9.

In a case where the surface of the thin wall 9 has a shape that easily causes separation of the air flow, it is confirmed that the air flow is not separated when the surface of the thin wall 9 is not positively charged, but the air flow could be separated when the surface of the thin wall 9 is positively charged. It is also confirmed that, when the surface of the thin wall 9 is positively charged, a degree of separation of an air flow is greater than that in the case where the surface of the thin wall 9 is not positively charged. In this way, it is confirmed that, when the surface of the thin wall 9 is positively charged, an air flow is separated from the surface of the thin wall 9 or separation of air happens based on electrical repulsive force.

Figure 7A:
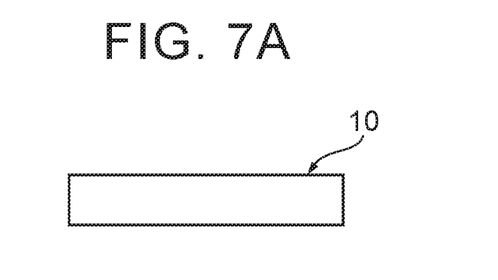
FIG. 7A, FIG. 7B and FIG. 7C are views showing a self-discharge static eliminator according to the embodiment of the invention.
Figure 7B:
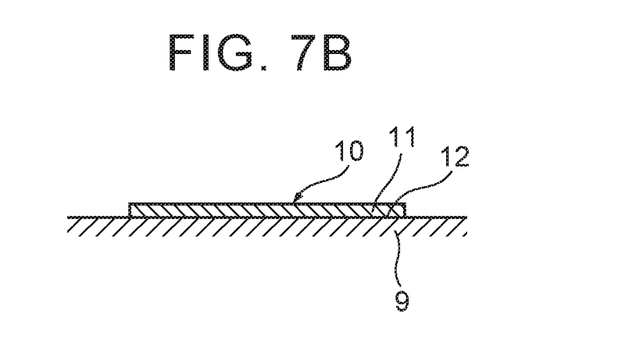
Figure 7C:
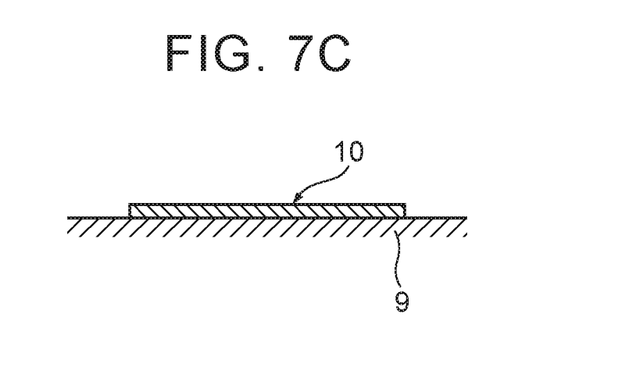

As stated above, when the surface of the thin wall 9 is positively charged, an air flow becomes different from a flow that is originally intended. In this case, once positive charge on the surface of the thin wall 9 is entirely or partially eliminated, or static elimination of the surface of the thin wall 9 is performed, to decrease the voltage value of the surface of the thin wall 9, it is possible to bring the air flow along the surface of the thin wall 9 back to an air flow in the case where the surface of the thin wall 9 is not positively charged. This means that, by static elimination, the air flow is restored to an air flow that is originally intended. Thus, the inventors considered an easily implemented static elimination method for restoring an air flow to one originally intended, and found an easily implemented static elimination method using a self-discharge static eliminator. FIG. 7A to FIG. 7C show examples of this self-discharge static eliminator. FIG. 7A and FIG. 7B show a plan view and a side sectional view of a typical self-discharge static eliminator 10, respectively. FIG. 7C shows a side sectional view of another self-discharge static eliminator 10.

In the example shown in FIG. 7A and FIG. 7B, the self-discharge static eliminator 10 has an elongated rectangular flat shape, and is also formed of metallic foil 11 that is adhered onto the surface of the thin wall 9 by a conductive adhesive 12. Meanwhile, in the example shown in FIG. 7C, the self-discharge static eliminator 10 is formed of a conductive thin film that is formed integrally with the surface of the thin wall 9. In the embodiment of the invention, static elimination of a part of the fan cover 1, the radiator 2, the condenser 3, and the inverter converter radiator 4 is performed by using the self-discharge static eliminators 10. Before giving explanation of the static elimination method for a part of the fan cover 1, the radiator 2, the condenser 3, and the inverter converter radiator 4, a basic static elimination method using the self-discharge static eliminator 10 according to the embodiment of the invention is explained first using an example case where static elimination of the surface of the thin wall 9 is performed by the self-discharge static eliminator 10.

Figure 8A:
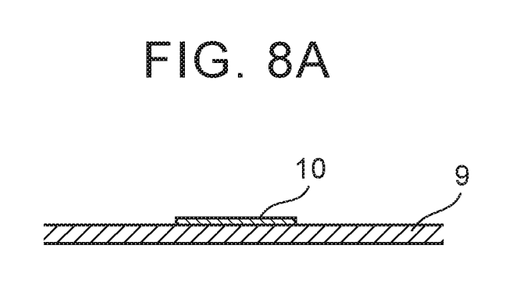
FIG. 8A and FIG. 8B are views for explaining a static elimination effect by the self-discharge static eliminator according to the embodiment of the invention.
Figure 8B:
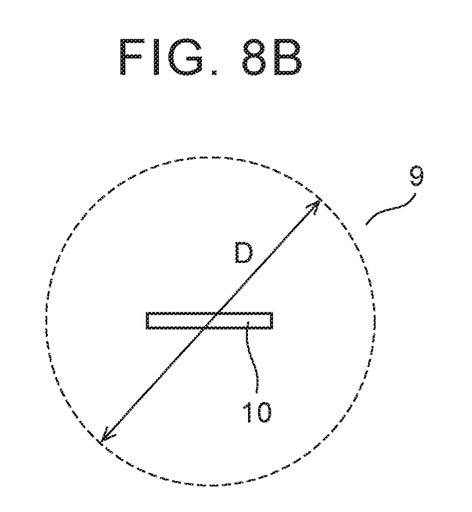

FIG. 8A shows a case where the self-discharge static eliminator 10 shown in FIG. 7A and FIG. 7B is installed on the surface of the thin wall 9. When the self-discharge static eliminator 10 is installed on the surface of the thin wall 9 as stated above, an electric charge amount of the surface of the thin wall 9 is reduced within a limited range shown as a broken line, the limited range being centered on the location where the self-discharge static eliminator 10 is installed as shown in FIG. 8B. As a result, it is confirmed that voltage of the surface of the thin wall 9 within the limited range shown as the broken line in FIG. 8B is decreased.

Figure 9A:
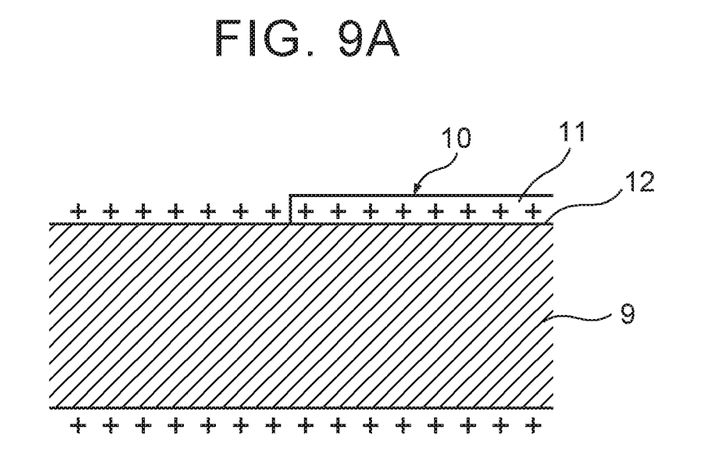
FIG. 9A and FIG. 9B are views for explaining a self-discharge effect according to the embodiment of the invention.

In this case, although it is not clear about the static elimination mechanism when static elimination of the surface and the surface of the thin wall 9 is performed by the self-discharge static eliminator 10, it is presumed that, because of an effect of the self-discharge static eliminator 10 for discharging positive charge, a static elimination effect could be performed on the surface of the thin wall 9 around the location where the self-discharge static eliminator 10 is installed. Next, the static elimination mechanism, which is presumed to be carried out on the surface of the thin wall 9, is explained with reference to FIG. 9A showing an enlarged sectional view of the thin wall 9, and FIG. 9B showing an enlarged view of an end part of the self-discharge static eliminator 10 shown in FIG. 9A.

As stated above, the thin wall 9 is made of a non-conductive synthetic resin material. When the thin wall 9 is made of a non-conductive synthetic resin material as stated above, the inside of the thin wall 9 is not charged, and the surface of the thin wall 9 is charged. As stated earlier, it has been confirmed that the surfaces of the fan cover 1, and the tanks 2a of the radiator 2 shown in FIG. 1 are charged positively. In the embodiment of the invention, in order to perform static elimination of the radiator 2 and so on, static elimination is performed on parts of the surface of the fan cover 1 and so on. Therefore, assuming a case where static elimination is performed on parts of the surface of the fan cover 1 and so on, FIG. 9A shows a case where the surface of the thin wall 9 is positively charged. Meanwhile, as stated earlier, the self-discharge static eliminator 10 is formed of the metallic foil 11 adhered to the surface of the thin wall 9 by the conductive adhesive 12. Since both the metallic foil 11 and the conductive adhesive 12 have conductivity, the inside of the metallic foil 11, i.e., inside of the self-discharge static eliminator 10, is positively charged.

Voltage of the self-discharge static eliminator 10 is about the same as voltage on the surface of the thin wall 9 around the self-discharge static eliminator 10. Therefore, the voltage of the self-discharge static eliminator 10 is quite high. Meanwhile, because air tends to be positively charged as stated earlier, positive air ions (expressed as + in a circle) are present in a part of air. In this case, in comparison between electrical potential of the air ion, and electrical potential of the self-discharge static eliminator 10, the electrical potential of the self-discharge static eliminator 10 is much higher than the electrical potential of the air ion. Therefore, when the air ion comes close to, for example, a corner part 13 of the self-discharge static eliminator 10 as shown in FIG. 9B, a field intensity becomes high between the air ion and the corner part 13 of the self-discharge static eliminator 10. As a result, discharge happens between the air ion and the corner part 13 of the self-discharge static eliminator 10.

Figure 9B:
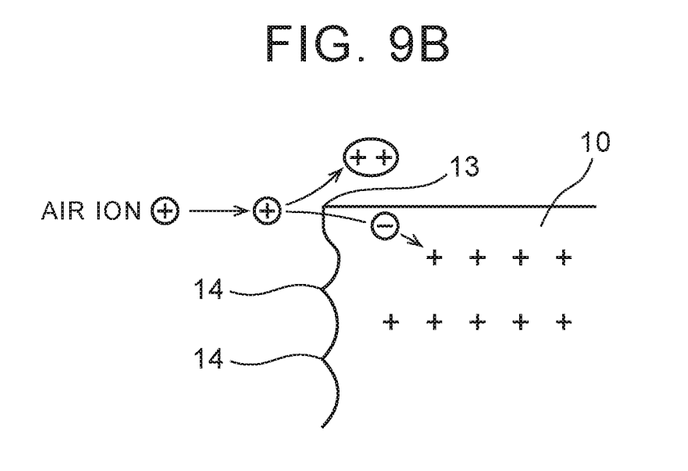

Once discharge happens between the air ion and the corner part 13 of the self-discharge static eliminator 10, some electrons of the air ions move into the self-discharge static eliminator 10 as shown in FIG. 9B. Therefore, a positive charge amount of the air ion is increased (expressed as ++ in a circle), and an electron that has moved into the self-discharge static eliminator 10 neutralizes positive charge on the self-discharge static eliminator 10. Once discharge is performed, further discharge occurs easily, and, when another air ion comes close to the corner part 13 of the self-discharge static eliminator 10, discharge happens immediately between the air ion and the corner part 13 of the self-discharge static eliminator 10. In short, when air moves around the self-discharge static eliminator 10, air ions move close to the corner part 13 of the self-discharge static eliminator 10 one after another. Therefore, discharge happens continuously between air ions and the corner part 13 of the self-discharge static eliminator 10.

Once discharge happens continuously between air ions and the corner part 13 of the self-discharge static eliminator 10, positive charge on the self-discharge static eliminator 10 is neutralized in succession. As a result, a positive charge amount on the self-discharge static eliminator 10 is reduced. Once the positive charge amount on the self-discharge static eliminator 10 is reduced, positive charge on the surface of the thin wall 9 around the self-discharge static eliminator 10 moves into the self-discharge static eliminator 10. Therefore, a positive charge amount on the surface of the thin wall 9 around the self-discharge static eliminator 10 is also reduced. As a result, voltage on the self-discharge static eliminator 10 and the surface of the thin wall 9 around the self-discharge static eliminator 10 is decreased gradually. This effect of decreasing voltage on the self-discharge static eliminator 10 and the surface of the thin wall 9 around the self-discharge static eliminator 10 continues until voltage on the self-discharge static eliminator 10 is decreased and the discharge effect is stopped. As a result, as shown in FIG. 8B, voltage on the surface of the thin wall 9 is decreased within the limited range shown as the broken line, centered on the location where the self-discharge static eliminator 10 is installed.

Meanwhile, as stated earlier, once discharge happens between an air ion and the corner part 13 of the self-discharge static eliminator 10, an air ion with an increased positive charge amount (expressed as ++ in a circle) is generated as shown in FIG. 9B, and the air ion with the increased positive charge amount is dispersed into circumambient air. The amount of air ions with the increased positive charge amount is extremely smaller than the amount of air flowing around the self-discharge static eliminator 10. When air around the self-discharge static eliminator 10 is stagnant and air ions do not move, discharge does not happen continuously, and voltage on the surface of the thin wall 9 is not decreased. This means that it is necessary to make air around the self-discharge static eliminator 10 flow in order to decrease voltage on the surface of the thin wall 9. During the engine operation, by taking air into the engine, air moves in the engine room including around the self-discharge static eliminator.

Discharge between an air ion and the self-discharge static eliminator 10 happens between the air ion and the corner part 13 of the self-discharge static eliminator 10, or between the air ion and sharp end parts 14 in a peripheral part of the self-discharge static eliminator 10. Therefore, in order to make discharge happen easily between an air ion and the self-discharge static eliminator 10, it is preferred that a number of sharp end parts 14 are formed, in addition to the corner part 13, in the peripheral part of the self-discharge static eliminator 10. Hence, when fabricating the self-discharge static eliminator 10, it is preferred that metallic foil is cut so that burrs like the sharp end parts 14 are formed in the section when fabricating the metallic foil 11.

The metallic foil 11 of the self-discharge static eliminator 10 shown in FIG. 7A and FIG. 7B is made of ductile metal such as aluminum or copper. The metallic foil 11 in the embodiment of the invention is formed of aluminum foil. Further, a longitudinal length of the aluminum foil 11 used in the embodiment of the invention is between about 50 mm and 100 mm, and a thickness is between about 0.05 mm and 0.2 mm. In this case, a diameter D of the limited range shown as the broken line in FIG. 8B, in which voltage is decreased, is between about 150 mm and 200 mm. An aluminum tape, in which a layer of the conductive adhesive 12 is formed on the aluminum foil 11, may be cut and used as the self-discharge static eliminator 10. Further, as shown in FIG. 7C, the self-discharge static eliminator 10 may be formed of a conductive thin film that is formed integrally with the surface of the thin wall 9. In this case, it is also preferred that a number of sharp end parts 14 are formed, in addition to the corner part 13, in a peripheral part of the conductive thin film as shown in FIG. 9B.

As explained earlier, it has been confirmed that the voltage values on the surfaces of the fan cover 1, the radiator 2, the condenser 3, and the inverter converter radiator 4 become as high as 1000 (v) or higher. In this case, judging from the experiment results shown in FIG. 6A and FIG. 6B, a flow of outside air, or an air flow, which flows inside the core 2b of the radiator 2, the core 3b of the condenser 3, and the core 4a of the inverter converter radiator 4, is changed by the high voltage, which presumably affects cooling efficiency. Thus, experimentation was carried out regarding cooling efficiency. As a result, it was found that cooling efficiency was deteriorated when the voltage values on outer peripheral surfaces of the core 2b of the radiator 2, the core 3b of the condenser 3, and the core 4a of the inverter converter radiator 4 were high. It was also found that, in this case, cooling efficiency was improved when the self-discharge static eliminator 10 is installed on a non-conductive wall surface of connecting part that connects the radiator 2 and the fan cover 1 with each other.

Figure 5A:
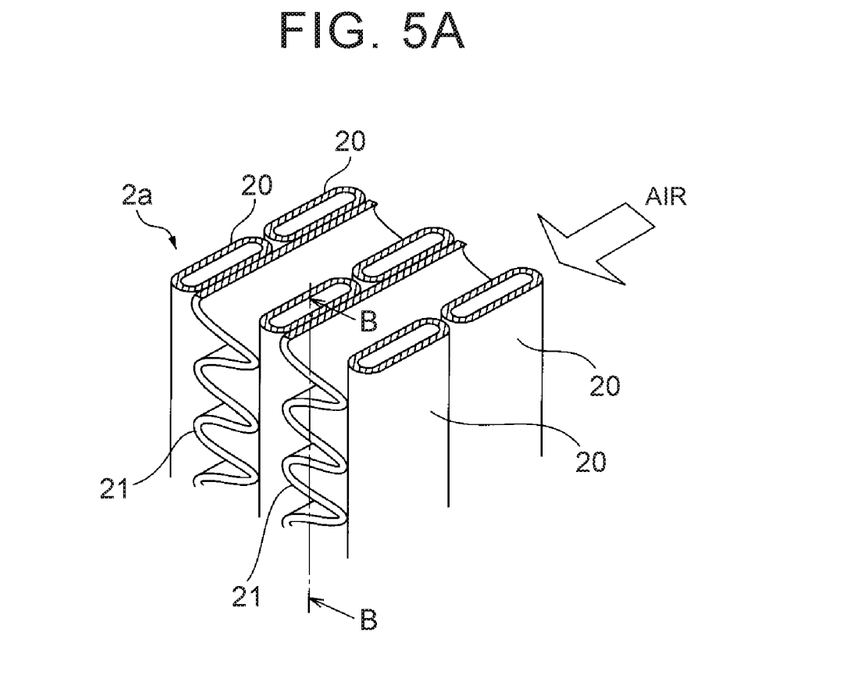
FIG. 5A and FIG. 5B are views for explaining an air flow in a core of the radiator according to the embodiment of the invention.
Figure 5B:
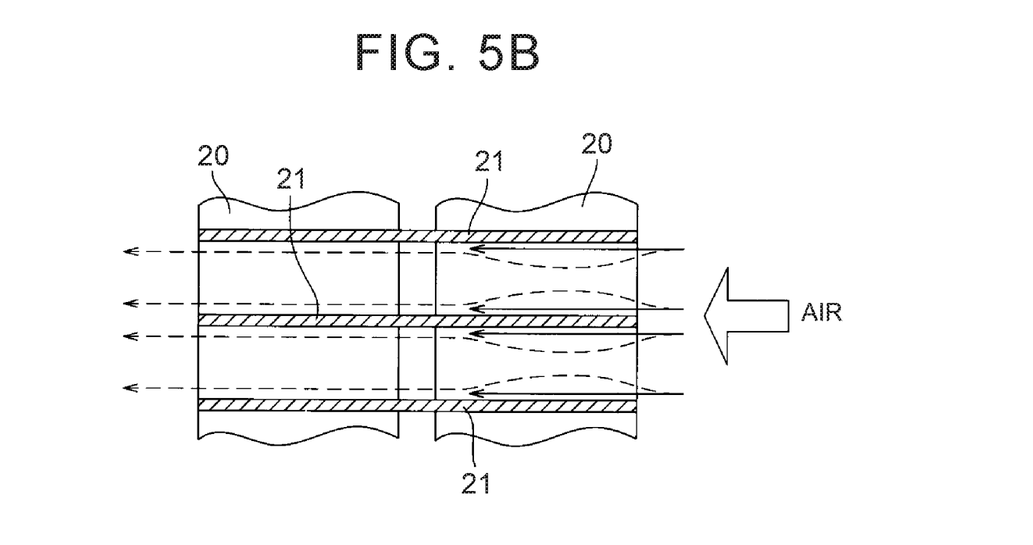

First of all, the reason for deterioration of cooling efficiency is explained briefly with reference to FIG. 5A and FIG. 5B by using an example case where a voltage value on the surface of the core 2b of the radiator 2 becomes high. FIG. 5A is an enlarged sectional perspective view of a part of the core 2b of the radiator 2, and FIG. 5B is a vertical sectional view taken along the line B-B in FIG. 5A. In FIG. 5A and FIG. 5B, reference numeral 20 indicates water pipes that are spaced apart from each other at intervals, and reference numeral 21 indicates corrugated cooling fins arranged between the water pipes 20. Air flows between the corrugated cooling fins 21, and cooling water flowing inside the water pipes 20 is thus cooled.

In FIG. 5B, solid-line arrows show air flows when voltage of the surface of the core 2b of the radiator 2, or voltage of the surfaces of the water pipe 20 and the corrugated cooling fin 21 is low, and, in this case, air flows along the surface of the corrugated cooling fin 21. However, when the voltage of the surface of the core 2b of the radiator 2, or the voltage of the surfaces of the water pipe 20 and the corrugated cooling fin 21 becomes high due to static electricity charge, air flowing along the surface of the corrugated cooling fin 21 is separated from the surface of the corrugated cooling fin 21 by electrical repulsive force as shown as broken-line arrows in FIG. 5B. As a result, air has to flow away from the surface of the corrugated cooling fin 21.

When air has to flow away from the surface of corrugated cooling fin 21 as stated above, a heat transfer rate from the surface of the corrugated cooling fin 21 to air is reduced. As a result, it becomes impossible to favorably reduce the temperature of cooling water flowing inside the water pipes 20. Thus, cooling efficiency is deteriorated. In this case, if voltage of the surface of the core 2b of the radiator 2, or voltage of the surfaces of the water pipes 20 and the cooling fins 21 is decreased, air flows along the surface of the corrugated cooling fins 21 as shown as the solid lines in FIG. 5B. As a result, the heat transfer rate from the surfaces of the corrugated cooling fins 21 to air is increased, thereby improving cooling efficiency. Thus, in this embodiment of the invention, the self-discharge static eliminator 10 is installed on a connecting part that connects the radiator 2 and the fan cover 1 with each other in order to decrease the voltage of the surface of the core 2b of the radiator 2, or the voltage of the surfaces of the water pipes 20 and the corrugated cooling fins 21. In this case, in this example of the invention, the self-discharge static eliminators 10 are installed on outer wall surfaces of the flanges 8a, 8b of the fan cover 1 as shown in FIG. 2A.

When the self-discharge static eliminators 10 are installed on the outer wall surfaces of the flanges 8a, 8b of the fan cover 1, electric charges within certain ranges centered on the self-discharge static eliminators 10 are eliminated by a static elimination effect produced by the self-discharge static eliminators 10, and voltage within the certain ranges centered on the self-discharge static eliminators 10 is decreased. As a result, voltage of the connecting parts, which connect the fan cover 1 and the radiator 2 with each other, is decreased, and, in the embodiment shown in FIG. 1 and FIG. 2A, voltage of the connectors 5, 6, which connect the fan cover 1 and the radiator 2 with each other, is decreased. When the voltage of the connectors 5, 6, which connect the fan cover 1 and the radiator 2 with each other, is decreased, voltage of the radiator 2, which is connected with the fan cover 1 through the connectors 5, 6, is decreased. As a result, voltage of the core 2a of the radiator 2 is decreased.

When the voltage of the core 2a of the radiator 2 is decreased, voltage on the surfaces of the water pipes 20 and the corrugated cooling fins 21 is decreased. As a result, as shown as the solid lines in FIG. 5B, air flows along the surfaces of the corrugated cooling fins 21. Since the heat transfer rate from the surfaces of the corrugated cooling fins 21 to air is increased, cooling efficiency is improved. Meanwhile, as stated earlier, when the electric motor 1b for the fan, which is supported by the fan cover 1, is driven, static electricity is generated. Therefore, as the electric motor 1b for the fan is driven continuously, a large amount of charge stays on the fan cover 1. As a result, a voltage value of the fan cover 1 remains high.

However, even when the voltage value of the fan cover 1 is maintained high, by installing the self-discharge static eliminators 10 on the outer wall surfaces of the flanges 8a, 8b of the fan cover 1, voltage of the surface of the fan cover 1 is decreased within the certain ranges centered on the self-discharge static eliminators 10. Therefore, voltage of the connectors 5, 6 located inside the certain ranges is decreased, thereby decreasing voltage of the radiator 2. This means that, when voltage of the connectors 5, 6 is decreased by the self-discharge static eliminators 10, a voltage value of the radiator 2 is decreased more greatly than the voltage value of the fan cover 1. Thus, cooling efficiency of the radiator 2 is improved.

Meanwhile, as shown in FIG. 2B, it is also possible to decrease voltage of the connectors 5, 6 by the self-discharge static eliminators 10 by installing the self-discharge static eliminators 10 on outer wall surfaces of the upper and lower tanks 2a of the radiator 2 near the connectors 5, 6, respectively. Hence, even when the self-discharge static eliminators 10 are installed on the outer wall surfaces of the upper and lower tanks 2a of the radiator 2 near the connectors 5, 6, respectively, as shown in FIG. 2B, it is still possible to maintain the voltage value of the core 2a of the radiator 2 low. Therefore, in this case, cooling efficiency of the radiator 2 is also improved.

Also, the voltage value of the core 2a of the radiator 2 is maintained low by installing self-discharge static eliminators 10 on outer wall surfaces of the connectors 5, 6, thereby improving cooling efficiency of the radiator 2. In other words, by installing the self-discharge static eliminators 10 on the connecting parts that connect the fan cover 1 and the radiator 2 with each other, it is possible to decrease voltage of the connectors 5, 6, thereby decreasing voltage of the radiator 2. Hence, according to the embodiment of the invention, the self-discharge static eliminators 10 are installed on non-conductive wall surfaces of the connecting parts that connect the radiator 2 and the fan cover 1 with each other. When the voltage of the radiator 2 is decreased, voltage of the air condenser 3, which is coupled with the radiator 2 through the connectors 7, is also decreased. Thus, voltage of the inverter converter radiator 4 is decreased. Therefore, heat transfer rates of the core 2b of the air condenser 3, and the core 4a of the inverter converter radiator 4 to air are increased, and, as a result, cooling efficiency is improved in the air condenser 3 and the inverter converter radiator 4.

As stated earlier, according to the embodiment of the invention, the self-discharge static eliminators 10 are installed on the non-conductive wall surfaces of the connecting parts that connect the radiator 2 and the fan cover 1 with each other. However, in some vehicle models, the fan cover 1 is not connected with the radiator 2, and the fan cover 1 is directly coupled with the condenser 3 in order to cool the condenser 3. In this case, the self-discharge static eliminators 10 are installed on non-conductive wall surfaces of connecting parts that connect the condenser 3 and the fan cover 1 with each other. Further, in some vehicle models, the inverter converter radiator 4 is not used.

Therefore, in the embodiment of the invention, the cooling device of the vehicle includes at least one of the radiator 2 and the condenser 3, as well as the fan cover 1 and the self-discharge static eliminator 10. The fan cover 1 includes the fan 1a for cooling the radiator 2 or the condenser 3. In this vehicle, the radiator 2, the condenser 3, and the fan cover 1 are positively charged. The self-discharge static eliminator 10 is installed on a non-conductive wall surface and decreases an electric charge amount on the non-conductive wall surface within a limited range centered on a location where the self-discharge static eliminator 10 is installed. The self-discharge static eliminator 10 is installed on a non-conductive wall surface of a connecting part that connects the radiator 2 or the condenser 3 with the fan cover 1 to perform static elimination of the radiator 2 or the condenser 3.

In one of the embodiments of the invention, the self-discharge static eliminator 10 is installed on a wall surface of the fan cover 1 around the foregoing connecting part. Further, the radiator 2 or the condenser 3 is connected with the fan cover 1 through the detachable connectors 5, 6. In another embodiment of the invention, the self-discharge static eliminators 10 are installed on the connectors 5, 6. The tanks 2a of the radiator 2 are made of a non-conductive synthetic resin material, and, at the same time, the tanks 2a of the radiator 2 are connected with the fan cover 1. In yet another embodiment of the invention, the self-discharge static eliminators 10 are installed on wall surfaces of the radiator tanks 2a around the foregoing connecting parts. Embodiments of the invention are not limited to the embodiments described in the specification. For example, a location where the self-discharge static eliminator 10 is installed may be modified appropriately.

What is claimed is:

1. A vehicle cooling device comprising:
   at least one of a radiator and a condenser;
   a fan cover including a fan configured to cool the at least one of the radiator and the condenser; the radiator, the condenser and the fan cover being positively charged;
   a connecting part that connects the fan cover and the at least one of the radiator and the condenser so that the fan cover and the at least one of the radiator and the condenser abut against each other; and
   a self-discharge static eliminator that is installed on a non-conductive wall surface of the abutment between the fan cover and the at least one of the radiator and the condenser, and is configured to decrease an electric charge amount of a part of the non-conductive wall surface within a limited range, centered on a location where the self-discharge static eliminator is installed, static elimination of the at least one of the radiator and the condenser being performed by the self-discharge static eliminator.

2. The vehicle cooling device according to claim 1, wherein the fan cover is made of a non-conductive synthetic resin material.

3. The vehicle cooling device according to claim 2, wherein the self-discharge static eliminator is installed on a wall surface of the fan cover near the connecting part.

4. The vehicle cooling device according to claim 1, wherein the at least one of the radiator and the condenser and the fan cover are connected with each other through a detachable connector, and the self-discharge static eliminator is installed on the connector.

5. The vehicle cooling device according to claim 1, wherein the at least one of the radiator and the condenser includes the radiator, a tank of the radiator is made of a non-conductive synthetic resin material, the tank is connected with the fan cover, and the self-discharge static eliminator is installed on a wall surface of the tank near the connecting part.

6. The vehicle cooling device according to claim 1, wherein the self-discharge static eliminator is formed of metallic foil adhered to the non-conductive wall surface by a conductive adhesive.

7. The vehicle cooling device according to claim 6, wherein the self-discharge static eliminator has a corner part configured to cause self-discharge.

8. The vehicle cooling device according to claim 6, wherein the self-discharge static eliminator has an rectangular flat shape.

9. The vehicle cooling device according to claim 1, wherein the self-discharge static eliminator is formed of a conductive thin film that is formed integrally on the non-conductive wall surface.

* * * * *